United States Patent
Bhardwaj et al.

(10) Patent No.: US 10,924,969 B2
(45) Date of Patent: Feb. 16, 2021

(54) PERIODIC NETWORK RESELECTION SEARCH WHILE RECEIVING MULTIMEDIA BROADCAST MULTICAST SERVICES

(71) Applicant: QUALCOMM Incorporated, San Diego, CA (US)

(72) Inventors: Ashish Bhardwaj, Hyderabad (IN); Edward Robert Hall, Bristol (GB)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/522,553

(22) Filed: Jul. 25, 2019

(65) Prior Publication Data

US 2020/0045599 A1  Feb. 6, 2020

(30) Foreign Application Priority Data

Jul. 31, 2018  (IN) .............................. 201841028755

(51) Int. Cl.
*H04W 36/04* (2009.01)
*H04W 36/00* (2009.01)
(Continued)

(52) U.S. Cl.
CPC ... *H04W 36/0088* (2013.01); *H04W 36/0007* (2018.08); *H04W 36/14* (2013.01); *H04W 36/36* (2013.01)

(58) Field of Classification Search
CPC ......... H04W 36/0007; H04W 36/0088; H04W 36/14; H04W 36/36; H04W 48/18;
(Continued)

(56) References Cited

U.S. PATENT DOCUMENTS

| 2014/0185455 | A1  | 7/2014 | Balasubramanian et al. |
| 2015/0223126 | A1* | 8/2015 | Jung ..................... H04W 36/04 455/444 |

(Continued)

FOREIGN PATENT DOCUMENTS

| EP | 2894906 A1 | 7/2015 |
| KR | 20150124687 A | 11/2015 |

OTHER PUBLICATIONS

International Search Report and Written Opinion—PCT/US2019/043750—ISA/EPO—dated Oct. 11, 2019.

(Continued)

*Primary Examiner* — Phuc H Tran
(74) *Attorney, Agent, or Firm* — Arent Fox LLP

(57) ABSTRACT

A user equipment (UE) registers on a first Public Land Mobile Network (PLMN) and, while in an idle mode, receives a Multimedia Broadcast Multicast Services (MBMS) service. The UE determines whether to perform a periodic network reselection search for a higher priority PLMN while in the idle mode, wherein the UE determines whether to perform the periodic network reselection search based on reception of the MBMS service. The UE may postpone the periodic network reselection search for a period of time while the UE receives the MBMS service in the idle mode. The UE may postpone the periodic network reselection search for a period of time while the UE receives the MBMS service in the idle mode. The UE may interleave the periodic network reselection search with the reception of transmission bursts of the MBMS service, the search being performed on frequencies other than that of the MBMS transmission.

29 Claims, 10 Drawing Sheets

(51) Int. Cl.
 *H04W 36/36* (2009.01)
 *H04W 36/14* (2009.01)
(58) Field of Classification Search
 CPC ....... H04W 4/06; H04W 48/20; H04W 36/04; H04W 36/0079; H04W 36/08; H04W 36/16; H04W 36/24; H04W 48/14
 See application file for complete search history.

(56) References Cited

U.S. PATENT DOCUMENTS

2020/0092748 A1* 3/2020 Teyeb ................... H04L 1/1848
2020/0187064 A1* 6/2020 Susitaival ......... H04W 36/0069

OTHER PUBLICATIONS

NOKIA: "Introduction of Rel-14 NB-IoT Enhancements into Idle Mode", 3GPP Draft; 36304_CR0352R1 (REL-14) _R2-1702149, 3rd Generation Partnership Project (3GPP), vol. RAN WG2, No. Athens, Greece; Feb. 13, 2017-Feb. 17, 2017, Mar. 18, 2018 (Mar. 18, 2018), XP051507832, 38 Pages, Retrieved from the Internet: URL:http://www.3gpp.org/ftp/tsg%5Fran/TSG%5FRAN/TSGR%5F75/Docs/RP%2D170637%2Ezip [retrieved on Mar. 18, 2018], paragraphs [04.1]. [04.4] paragraphs [05.2]. [5.2.3.3]. [5.2.4.1].

Qualcomm: "Delaying Periodic Higher Priority PLMN Searches and Reselection Attempts When Receiving eMBMS Service in Idle Mode", 3GPP Draft; S1-182051 CR 22.011 16.2.0 Postponing HPLMN Search for EMBMS in Idle When Roaming, (3GPP), vol. SA WG1, No. West Palm Beach, FL, USA; Aug. 20, 2018-Aug. 24, 2018, Aug. 3, 2018 (Aug. 3, 2018), XP051534545, 2 Pages, Retrieved from the Internet: URL:http://www.3gpp.org/ftp/tsg%5F-sa/WG1%5FServ/TSGS1%5F83%5FWPalmBeach/Docs/S1%2D182051%2Ezip [retrieved on Aug. 3, 2018], paragraph [3.2.2.5].

* cited by examiner

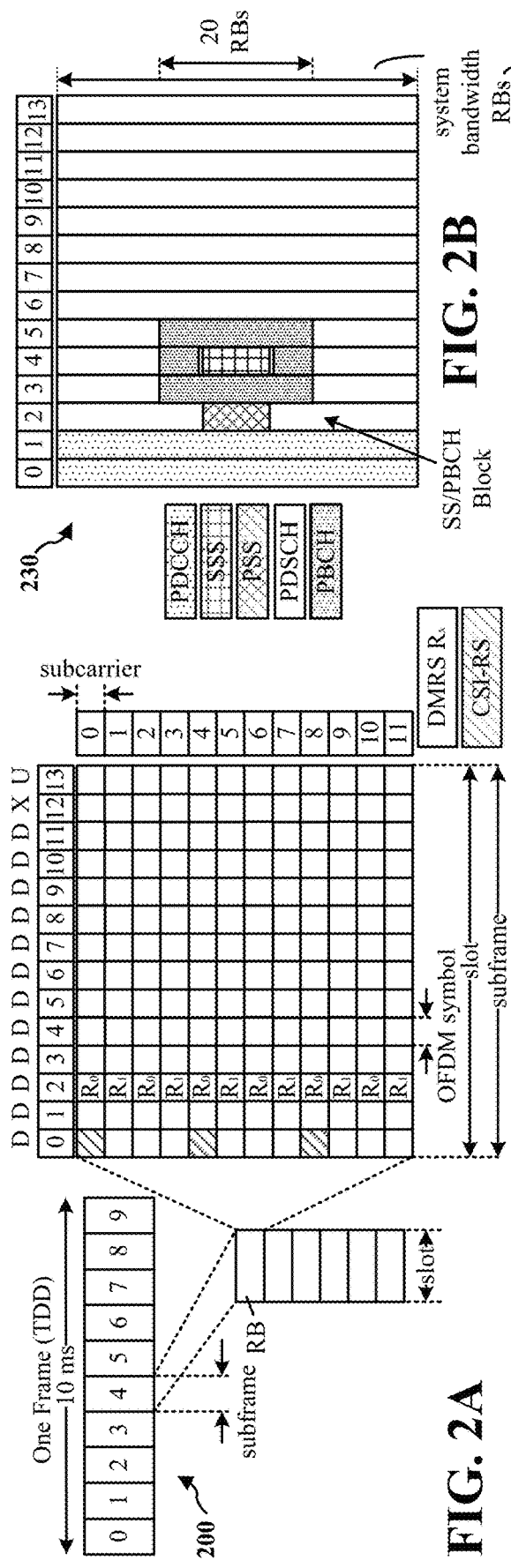
FIG. 2A
FIG. 2B
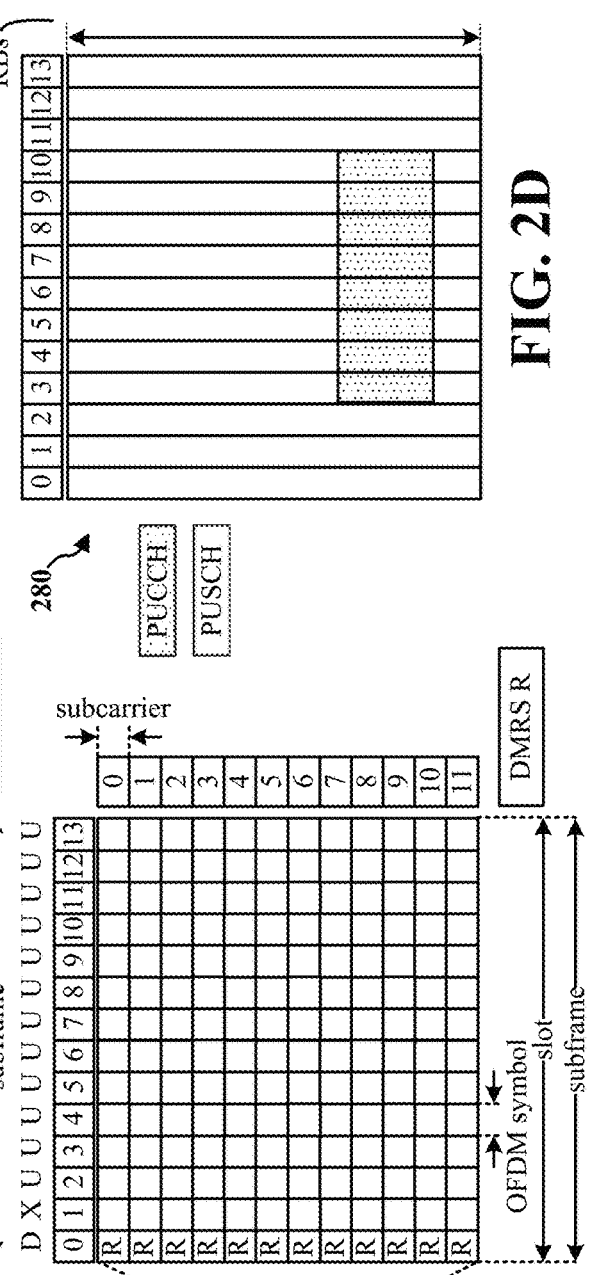
FIG. 2C
FIG. 2D

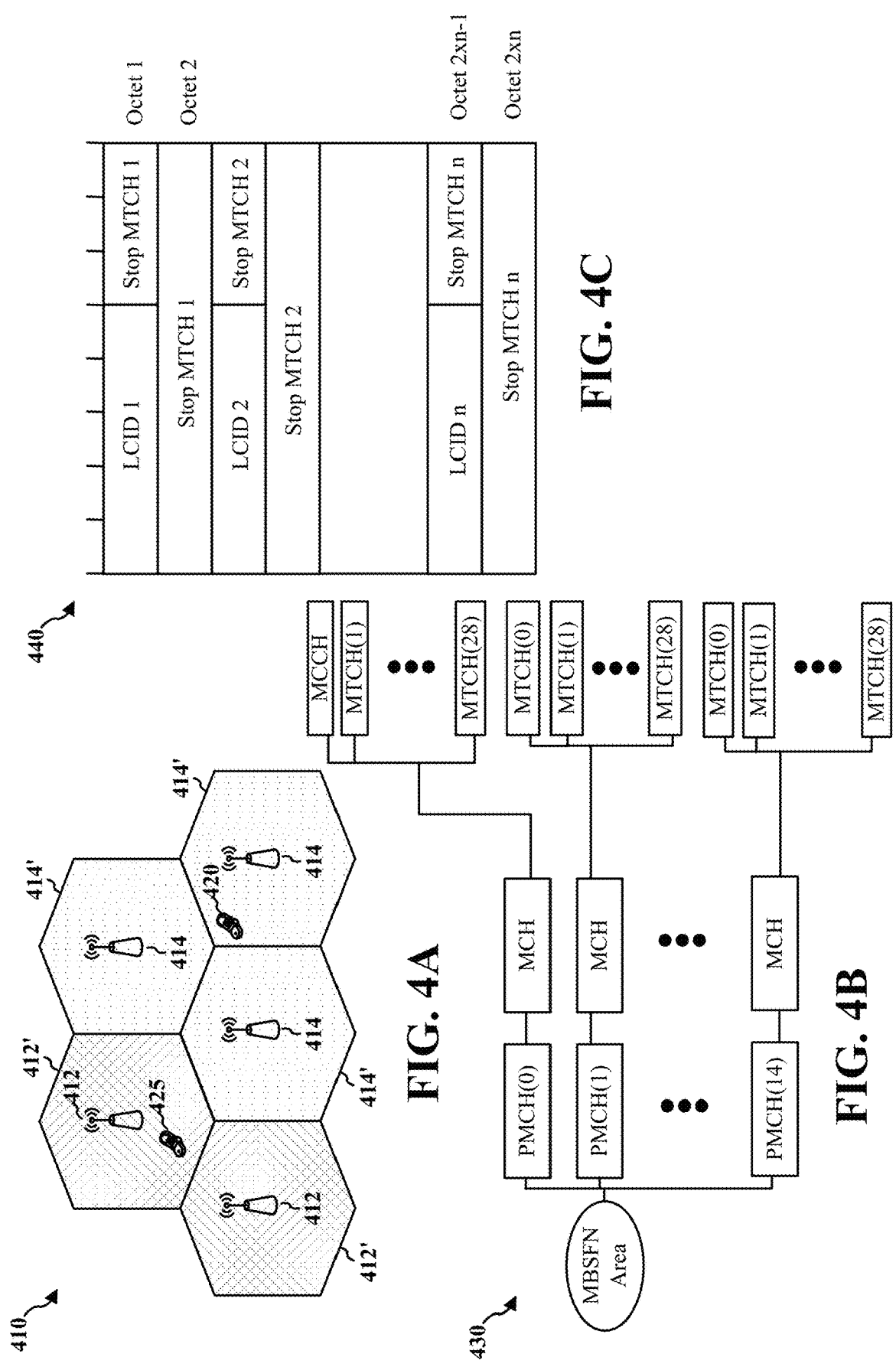

PERIODIC NETWORK RESELECTION SEARCH WHILE RECEIVING MULTIMEDIA BROADCAST MULTICAST SERVICES

CROSS REFERENCE TO RELATED APPLICATION(S)

This application claims the benefit of Indian Application Serial No. 201841028755, entitled "Periodic Network Reselection Search While Receiving Multimedia Broadcast Multicast Services" and filed on Jul. 31, 2018, which is expressly incorporated by reference herein in its entirety.

BACKGROUND

Technical Field

The present disclosure relates generally to communication systems, and more particularly, to wireless communication including a periodic network reselection search.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may perform a periodic network reselection search for a higher priority Public Land Mobile Network (PLMN). This PLMN might not be the Home PLMN (HPLMN) or the highest priority Equivalent HPLMN (EHPLMN). Therefore, the UE may be required to perform a periodic network reselection search for a higher priority PLMN. The amount of time for the periodic network reselection search may vary, e.g., depending on a number of bands, the number of cells detected by the UE, etc. The search time may negatively impact a user experience.

The present application presents solutions to such problems and helps to reduce the impact of periodic network reselection searches on the quality of service experienced by a user.

In an aspect of the disclosure, a method, a computer-readable medium, and an apparatus are provided. The apparatus registers on a first PLMN, e.g., a PLMN other than the HPLMN or the EHPLMN. The apparatus receives a Multimedia Broadcast Multicast Services (MBMS) service while in an idle mode. The apparatus determines whether to perform a periodic network reselection search for a higher priority PLMN while in the idle mode based on reception of the MBMS service. The apparatus may postpone the periodic network reselection search for a period of time while the apparatus receives the MBMS service in the idle mode. The apparatus may interleave the periodic network reselection search with the reception of transmission bursts of the MBMS service, the periodic network reselection search being performed on frequencies other than that of the MBMS transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 4A is a diagram illustrating an example of Multicast Broadcast Single Frequency Network areas in an access network.

FIG. 4B is a diagram illustrating an example of an evolved Multimedia Broadcast Multicast Service channel configuration in a Multicast Broadcast Single Frequency Network.

FIG. 4C is a diagram illustrating a format of a Multicast Channel (MCH) Scheduling Information (MSI) Medium Access Control element.

DETAILED DESCRIPTION

Figure 1:
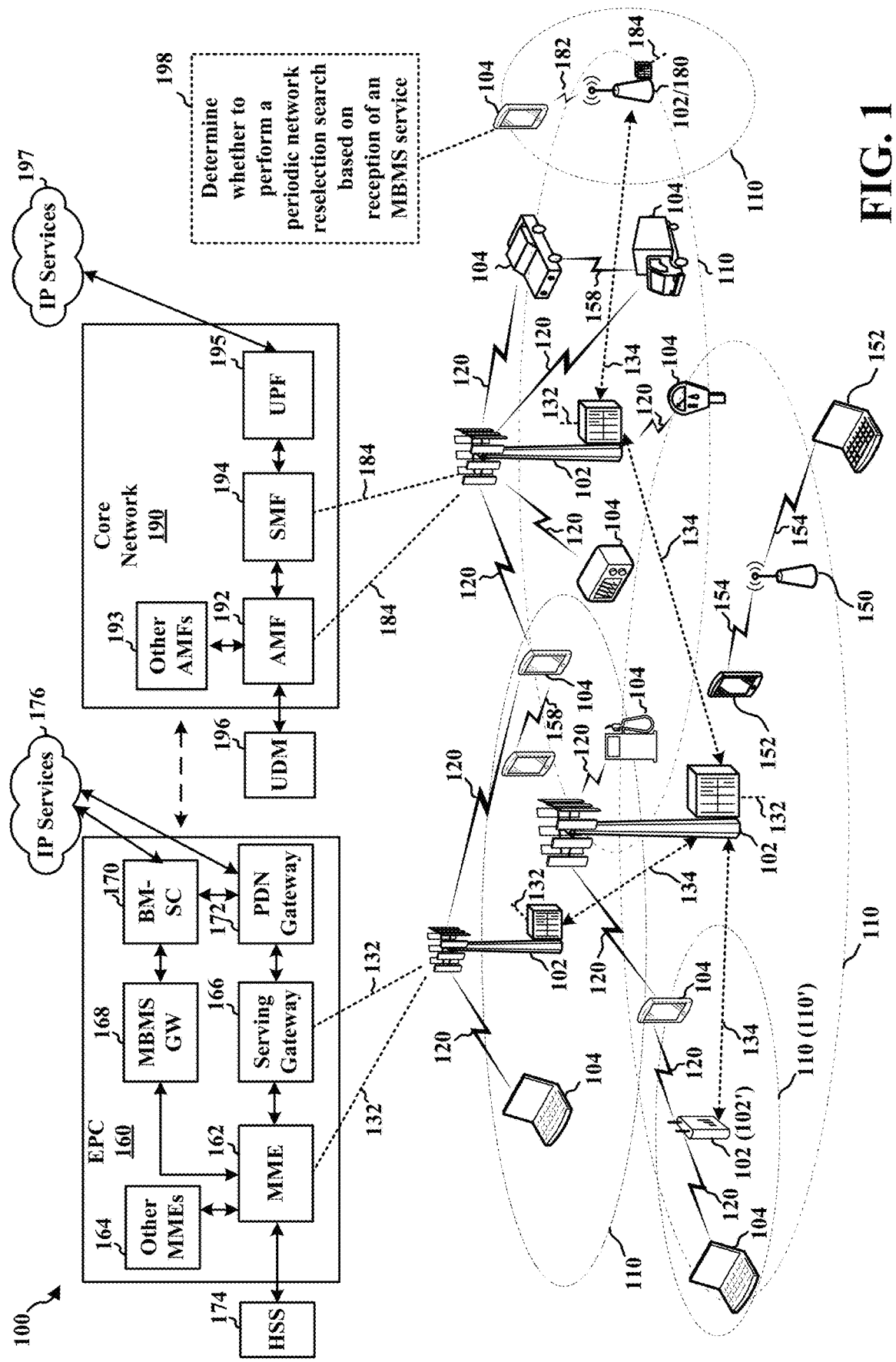
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a network reselection component 198 configured to determine whether to perform the periodic network reselection search based on reception of an MBMS service. For example, the network reselection component 198 may be configured to postpone a periodic network reselection search for a period of time while a UE is receiving the MBMS service in an idle mode. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
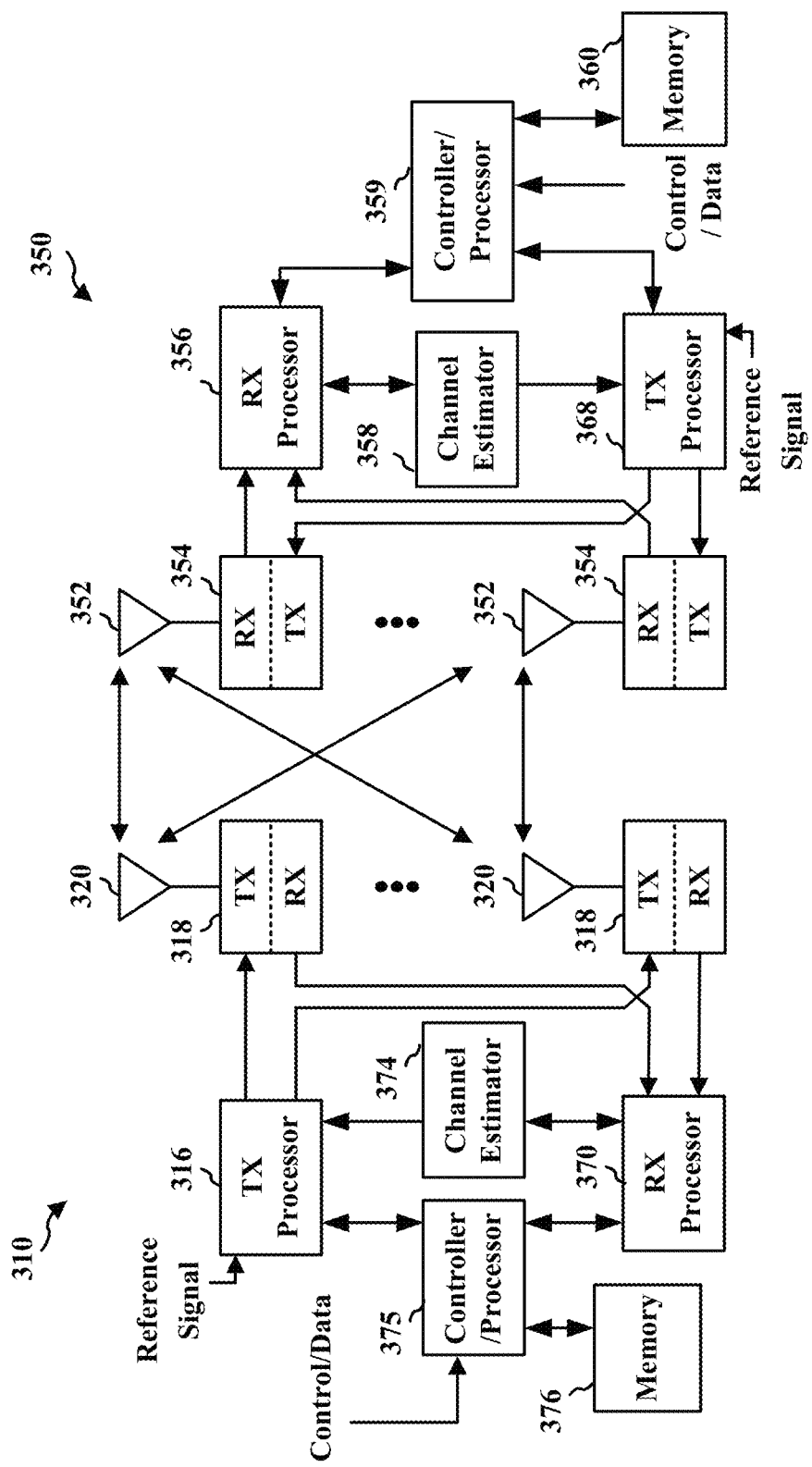
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with network reselection component 198 of FIG. 1.

FIG. 4A is a diagram 410 illustrating an example of MBSFN areas in an access network. The base stations 412 in cells 412' may form a first MBSFN area and the base stations 414 in cells 414' may form a second MBSFN area. The base stations 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each base stations in an MBSFN area synchronously transmits the same MBMS control information and data. The MBMS may comprise an Evolved Multimedia Broadcast Multicast Services (eMBMS) service. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MB SFN area may support a second MBMS broadcast service, such as by providing a different news broadcast to UE 420.

FIG. 4B is a diagram 430 illustrating an example of an MBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on a cell, e.g., an LTE cell or other cell, to discover the availability of MBMS service access and a corresponding access stratum configuration. Initially, the UE may acquire system information, a SIB (e.g., SIB13). Subsequently, based on the SIB, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an example MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCD) field (e.g., LCID 1, LCID 2, LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCD.

Figures 5A, 5B:
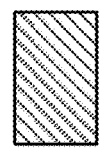
FIGS. 5A and 5B illustrate examples of FDD MBSFN subframes and TDD MBSFN subframes.
Figure 6:
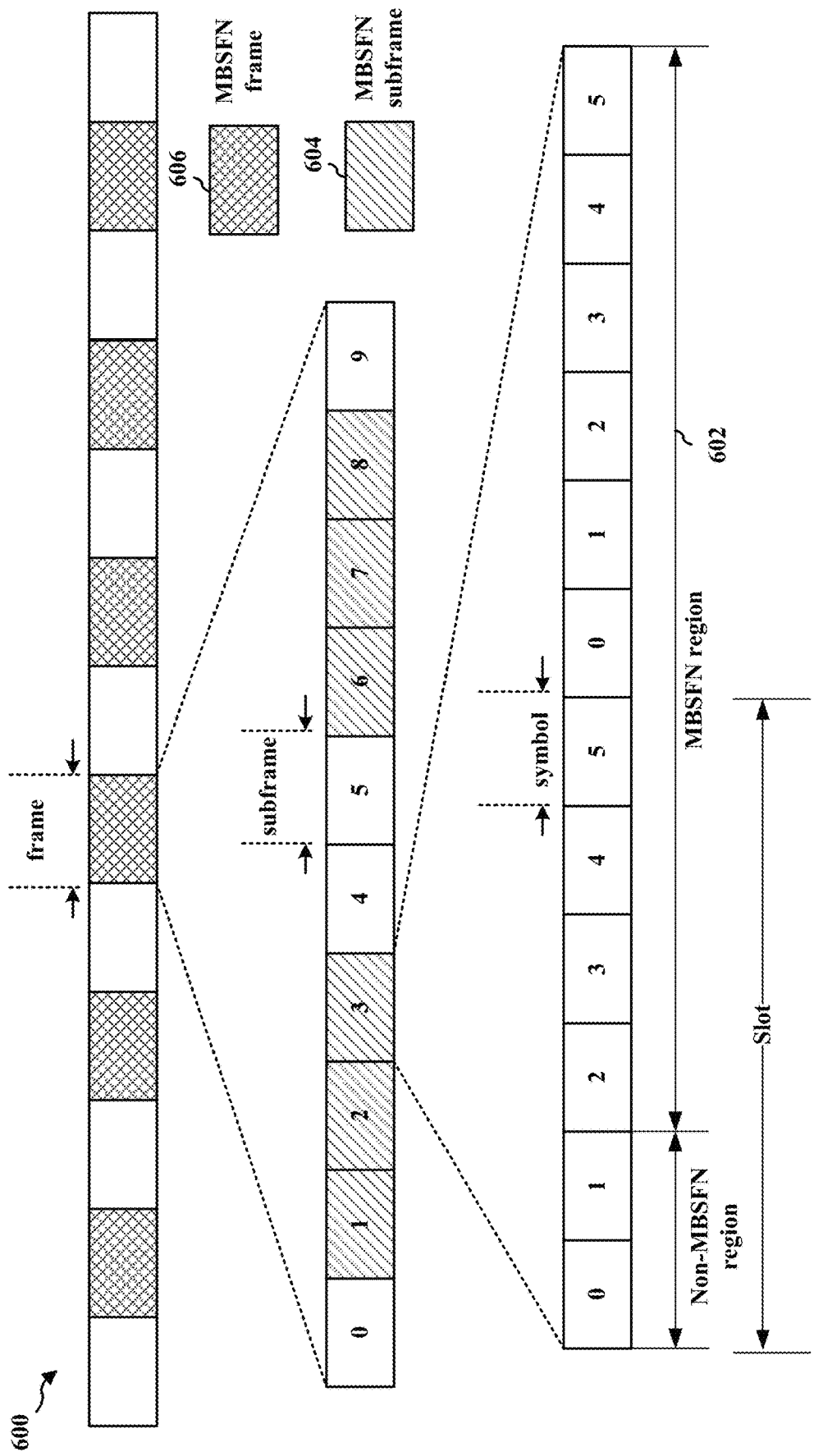
FIG. 6 illustrates an example frame structure comprising MBSFN frames.

FIG. 5A illustrates an example of FDD MBSFN subframes 500 and FIG. 5B illustrates an example of TDD MBSFN subframe configurations 502. The shaded subframes in FIGS. 5A and 5B may be used for MBMS transmissions from the network. Each MBSFN subframe may comprise 1 ms that for MBSFN, e.g., an system frame such as a 10 ms LTE system frame. MBMS services may comprise an MBMS streaming service or an MBMS download service. In order to broadcast or multicast an MBMS service, the network may select a configuration from among available configurations to schedule the MBSFN. As an example, the configuration may be described in a pattern of 6 subframes. For example, "111111" may correspond to a pattern using subframes 1, 2, 3 and 6, 7, 8 for MBSFN. The pattern for "111111" is illustrated in the FDD MBSFN example 500 in FIG. 5A. For example, in FDD, MBSFN may not be transmitted in subframes 0, 4, 5, and 9. Thus, the pattern "111111" indicates MBSFN is transmitted in each of the potential subframes 1, 2, 3, 6, 7, 8. The network may use all of the indicated subframes (e.g., 1 ms each) in a system frame. As another example, "110000" may correspond to subframes 1 and 2 in FDD. Thus, only two subframes of the LTE frame might be used for the MBMS service. In another example, "100000" may indicate that only subframe 1 is used for the MBMS service. "111111," "110000," and "100000" are merely examples. Other subframe patterns may also be used for transmission of an MBMS service. FIG. 5B illustrates examples of different MBMS configurations 502 for TDD MBSFN subframes for various uplink-downlink configurations. In TDD, MBSFN might not be transmitted in subframes 0, 1, 2, 5, and 6, for example. TDD enables dynamic changing of the uplink and downlink balance and characteristics to meet the load conditions. Thus, in TDD, the subframes used for MBSFN may depend on the uplink/downlink configuration. FIG. 6 illustrates an example frame structure 600 for MBSFN. MBMS services may be transmitted in the MBSFN region 602 of MBSFN subframes 604 in MBSFN radio frames 606.

A UE may select any of the MBMS services available in an MBSFN area. MBSFN Scheduling information may inform the UE which subframes are associated with the service selected by the UE. Scheduling may be provided through higher layers, e.g., system information such as SIB 13 and SIB2. Other subframes are usable for unicast transmissions. For example, a UE may obtain an MBSFN configuration for an MBMS service from SIB13 and SIB2.

Once the UE is aware of the subframes that UE needs to decode to receive the PMCH data for a selected MBMS service, e.g., based on obtaining the scheduling information in SIB13 and SIB2, the UE may attempt to decode the PMCH based on the scheduled subframes. An MBMS service may be transmitted in scheduled bursts of MBMS data. There may be a time gap (e.g., in system frames, subframes, etc.) between the subframes to receive the MBMS service. The time gap may be due to network configuration, e.g., and may provide time for other transmissions, such as unicast transmissions or other MBMS services. The time gap may be due to another service that the user is not currently watching that is streaming over PMCH. The PMCH subframes, e.g., for the other MBMS service, will not be decoded by the UE.

A UE that is roaming or not in a preferred PLMN may be expected to automatically perform a periodic network reselection search for a higher priority PLMN whenever the UE is in an idle mode. This automatic search for a more preferred PLMN may enable the UE to find a more suitable PLMN when the UE is not in the highest priority PLMN. The periodic network reselection search may comprise a high-priority PLMN (HP-PLMN) reselection attempt and may also be referred to herein as a PLMN search. The UE may receive MBMS services even when the UE is in an idle mode. Such MBMS services may include MBMS streaming services and/or MBMS download services, as described in connection with FIGS. 4A-6. If an HP-PLMN reselection attempt is required for a UE in an idle mode, the UE may be expected to prioritize a PLMN search over reception of the MBMS service. The amount of time for the periodic network reselection search may vary, e.g., depending on a number of bands for the operators, the number of cells detected by the UE, etc. For example, an HP-PLMN reselection search time may take between 40-60 seconds or longer depending on the number of cells that are detected by the UE. The search time for the periodic network reselection search may negatively impact a user experience through interruption and pauses in the reception of the MBMS service while the PLMN search is performed. The UE may miss a portion of the MBMS data when the UE leaves the MBMS frequency to perform a network reselection search on other frequencies. When a user is receiving an MBMS service, the user is typically focused on the MBMS service, e.g., watching a video stream or other MBMS content. Thus, such interruption and pauses in the MBMS service due to periodic network reselection searches can lead to a poor user experience. A PLMN search may lead to a video buffer underflow that impacts the quality of service for the MBMS service being received at the UE. The impact of the periodic network reselection search on the reception of the MBMS service may be significant, as the periodic network reselection search may be configured to be performed every few minutes. For example, an HP-PLMN reselection search may be configured to occur every 6 minutes.

The present application presents solutions to the problem of MBMS service interruption and enables periodic network reselection searches that reduce the impact on a quality of service at the UE. The aspects presented herein enable the UE to reduce reception issues in receiving MBMS services when the device needs to search for a higher priority network.

In an example, a UE roaming in a VPLMN may postpone performing a periodic network reselection attempt (e.g., HP-PLMN search) for a period of time when the UE is receiving an MBMS service, even though the UE is in an idle mode. A UE receiving an MBMS streaming service for a sport event may receive the MBMS service for longer than an hour. The UE may delay a periodic network reselection attempt even though the UE is in an idle mode for that length of time and is roaming in a VPLMN. In one example, the UE may postpone the periodic network reselection search for the entire duration of the MBMS service. Thus, the UE may make a single determination to postpone the search until reception of the MBMS service is finished. In another example, the UE may repeatedly determine to postpone a periodic network reselection search for a period of time as long as the UE is continuing to receive the MBMS service. The period of time may be a few seconds, e.g., 20 seconds, a few minutes, etc. Thus, every 20 seconds, the UE may determine whether the UE is continuing to receive the MBMS service. If the MBMS service is ongoing, the UE may postpone the periodic network reselection for another 20 seconds. The UE may perform the periodic network reselection search (e.g., an HP-PLMN reselection attempt) when the MBMS service concludes.

In another example, the UE may interleave a periodic network reselection search with the ongoing reception of the MBMS service. For example, the UE may perform a partial HP-PLMN search in blocks that are interleaved with the ongoing MBMS transmission bursts. MBMS transmission bursts may be frequent and scheduled. The UE may receive an MBMS configuration for a selected MBMS service to determine the subframes scheduled for the delivery of MBMS data, e.g., in transmission bursts. As an example, the schedule of delivery for an eMBMS may be based on LTE system frames and/or subframes. Using this configuration, the UE can schedule the execution of the periodic network reselection search. The UE's modem may use the remaining time to perform at least part of a periodic network reselection search. Thus, the UE may perform an HP-PLMN reselection attempt in subframes and/or frames that are not scheduled for the transmission of the MBMS service. In an example in which the MBMS burst is transmitted for 80 ms every 320 ms, the UE may use the remaining 260 ms to perform a periodic network reselection search in an interleaved manner. While the UE may perform the periodic network reselection search in a slower manner that if the UE dedicated the modem to the search, the UE is able to perform a robust PLMN search without inhibiting reception of the MBMS service. FIG. 6 illustrates an example of gaps between MBSFN frames and MBSFN subframes that may carry the MBMS service.

Figure 7:
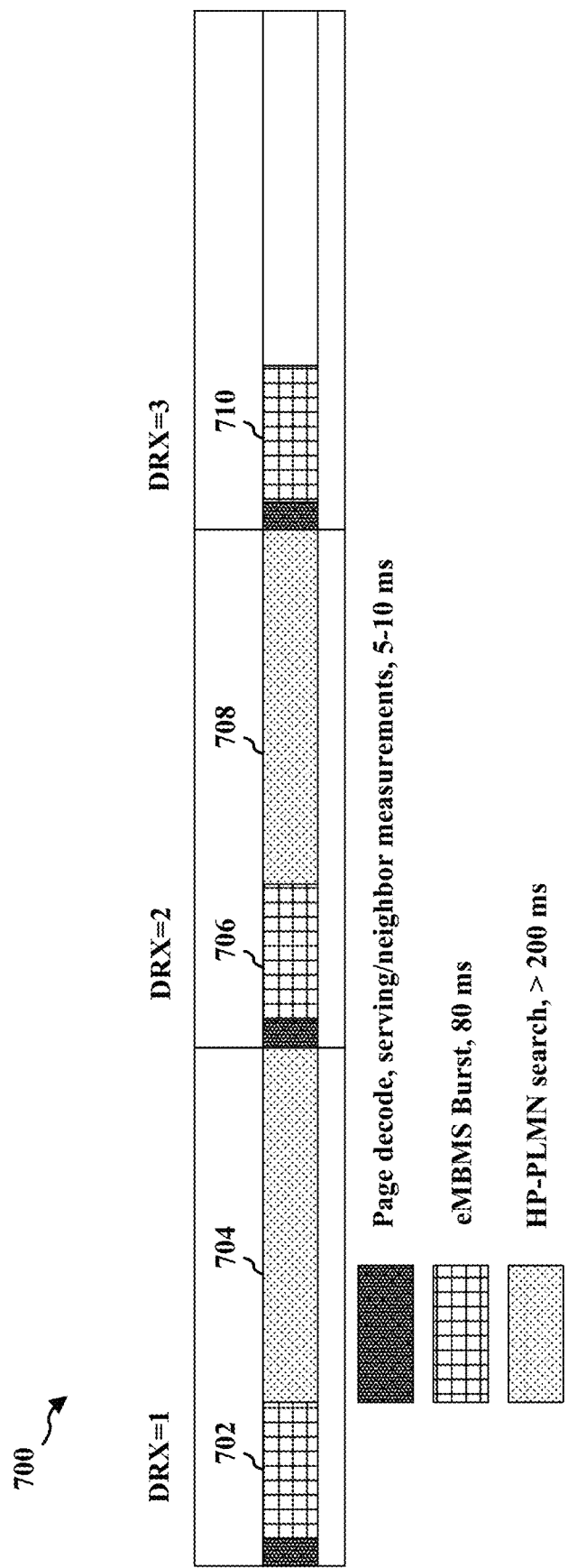
FIG. 7 illustrates an example of a PLMN search interleaved with MBMS bursts.

An MBMS service is received over a particular frequency, whereas the periodic network reselection search needs to be performed over multiple frequencies. For example, the UE may search for the availability of all bands in all detected cells as part of the periodic network reselection search. The UE may scan over all bands to detect which cells are available to the UE and to which PLMN the cells are connected. The UE may leave the MBMS frequency to perform at least part of the periodic network reselection search on other frequencies. The UE may then return to the MBMS frequency in time to receive the next MBMS burst. In this manner, a periodic network reselection search can be performed in blocks that are interleaved in time with an ongoing MBMS service with a reduced impact on the user experience. FIG. 7 illustrates an example timeline 700 in which a partial PLMN reselection attempt 704 is interleaved in time between MBMS bursts 702 and 706. As well, a second partial PLMN reselection attempt 708 is interleaved between MBMS bursts 706 and 710. The example in FIG. 7 shows a timeline for multiple DRX cycles. In the illustrated example, the idle DRX has a duration of 320 ms. This is merely one example, and aspects presented herein may be applied to cycles having any duration.

If a higher priority PLMN is found during the periodic network reselection search, the UE may delay changing to the PLMN when the change would interrupt reception of the MBMS service. Changing to the higher priority PLMN could cause the UE to lose the ongoing reception of the MBMS service. Thus, similar to the delaying the periodic network reselection search, a change to a new PLMN may be delayed until the UE has finished reception of the MBMS service. The UE may postpone registering with a higher priority PLMN for the duration of the MBMS service. In another example, the UE may repeatedly delay registering with a higher priority PLMN for a short period of time, for as long as the MBMS service continues.

In another example, the UE may delay the periodic network reselection attempt until the UE identifies a time period of inactivity for the MBMS session that will allow the UE to perform a full network reselection attempt. The reselection attempt may be postponed repeatedly for a short period until there is a known period of modem inactivity for the MBMS session. For example, an HP-PLMN search may be repeatedly postponed for a period of time, e.g., ranging between 200 ms to 20 seconds, until the period of inactivity is determined by the UE. The period of inactivity for the MBMS service may be based on a size of the UE video buffer and/or a length of time until new data is scheduled for the MBMS. For example, if the UE video buffer has a buffered level beyond 60 seconds and no new data is scheduled on the MBMS carrier for the next 60 seconds, the UE may leave the MBMS frequency to perform the full network reselection search on other frequencies. At the end of the network reselection search, the UE may return to the MBMS frequency to receive the next scheduled MBMS data. In this example, a full HP-PLMN reselection attempt may be interleaved between a MBMS burst and the following MBMS burst. By interleaving the network reselection attempt between MBMS bursts, the UE is able to perform the network reselection search without releasing the MBMS context. A time gap of a few system frames may provide the necessary time for the UE to perform an HP-PLMN reselection search. For example, 20 system frames providing a 200 ms gap may provide enough time for the UE to perform the HP-PLMN search.

In another example, the UE may present an option to the user to decide whether to interrupt the ongoing MBMS service with a periodic network reselection search. Thus, when an HP-PLMN search is triggered based on the UE roaming in a VPLMN and in an idle mode, the UE may determine whether the UE is also receiving an MBMS service. If the UE is receiving the MBMS service, the UE may display a message on a display screen requesting user input as to whether the user wants to initiate the search for a higher priority PLMN. The message may indicate that the search for a higher priority PLMN, e.g., a home PLMN, will suspend streaming of the MBMS service. The message may ask whether the user wants to proceed with the HP-PLMN reselection attempt or to cancel the search. The UE may then receive input indicating to perform the HP-PLMN reselection attempt without regard to interruption of the MBMS service or input indicating to cancel or to delay the HP-PLMN reselection attempt. The indication to cancel/delay the HP-PLMN reselection attempt may indicate that reception of the MBMS service should be prioritized over the HP-PLMN reselection attempt. The user input may indicate a time to which the search should be delayed.

When the user input indicates to cancel the HP-PLMN reselection attempt, the UE may postpone the HP-PLMN reselection attempt for the duration of the MBMS service. In another example, the UE may repeatedly postpone the HP-PLMN reselection attempt for a short period of time as long as the MBMS service continues. The short period of time may comprise a few seconds, e.g., 20 seconds.

Figure 8:
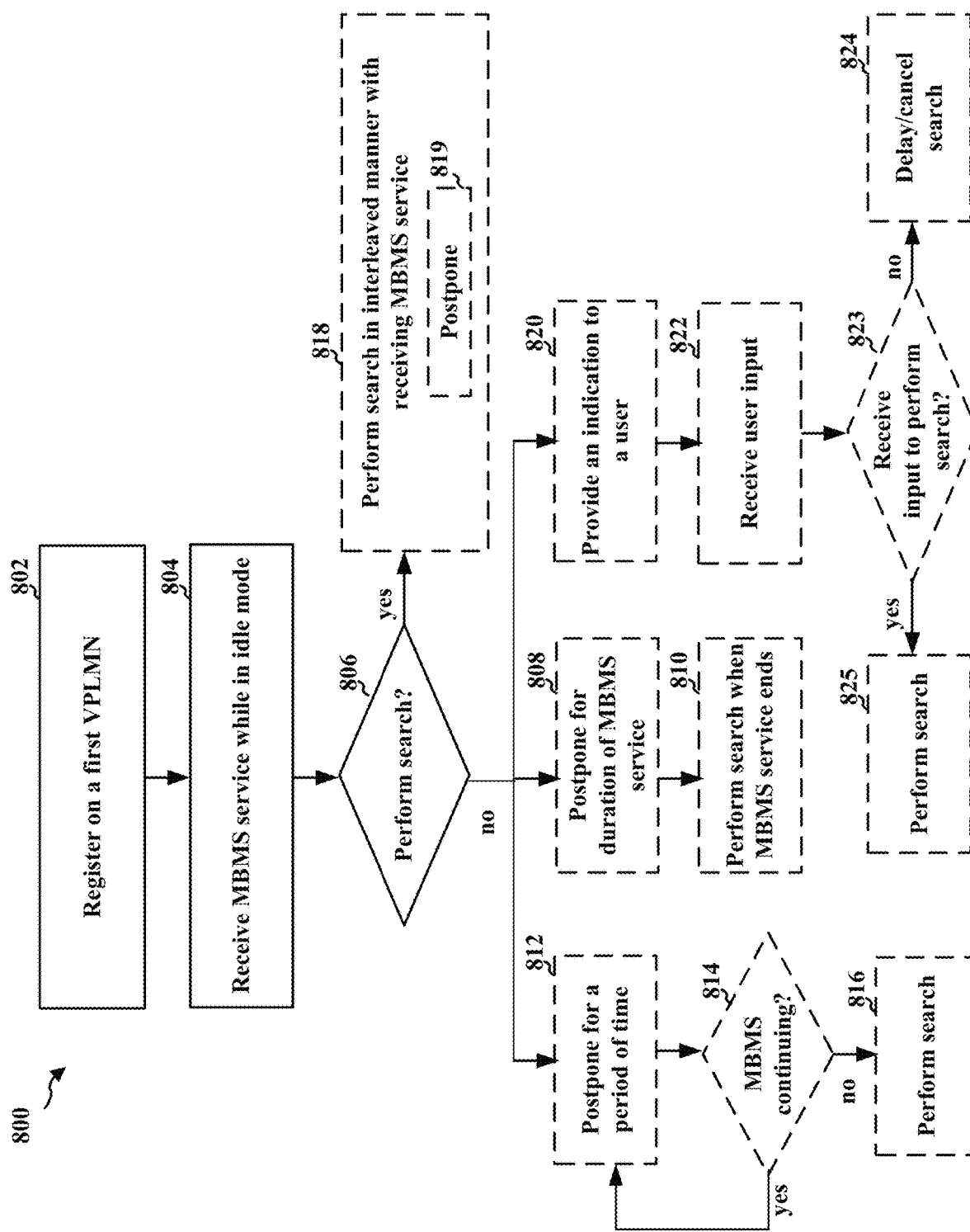
FIG. 8 is a flowchart of a method of wireless communication.

FIG. 8 is a flowchart 800 of a method of wireless communication. The method may be performed by a UE (e.g., UE 104, 350, 420, 425, the apparatus 902, 902'; the processing system 1014, which may include memory 1060 and which may be the entire UE 350 or a component of a UE 350, such as the TX processor 368, the RX processor 356, and/or the controller/processor 359). Optional aspects are illustrated with a dashed line. The method enables a UE to improve a user experience by reducing the impact of periodic network reselection searches on the reception of MBMS services.

At 802, the UE registers on a first PLMN. For example, the registration may be performed by PLMN component 908 of apparatus 902. This first PLMN may be known to the UE to not be the HPLMN or the EHPLMN. Therefore, the UE may be required to perform a periodic network reselection search for a higher priority PLMN. For example, the UE may be roaming in a VPLMN. Thus, the first PLMN may not be a preferred PLMN, e.g., not an HP-PLMN.

At 804, the UE may receive an MBMS service while in an idle mode. For example, the reception of the MBMS service may be performed by MBMS component 910 and/or reception component 904 of apparatus 902. The MBMS service may comprise an MBMS streaming service or an MBMS download service. The MBMS service may comprise an eMBMS service. The UE may receive an MBMS configuration indicating a transmission schedule for the MBMS service, as described in connection with FIGS. 5A, 5B, and 6. The UE may use the scheduling information to receive the MBMS service.

At 806, the UE determines whether to perform a periodic network reselection search for a higher priority PLMN while in the idle mode. For example, the determination may be performed by determination component 912 of apparatus 902. For example, a UE may perform a periodic network reselection search when the UE is in an idle mode, and the UE may determine whether to proceed with performing the periodic network reselection search based on reception of the MBMS service in the idle mode. The periodic network reselection search may comprise an HP-PLMN search.

As illustrated at 808, the UE may postpone the periodic network reselection search for a duration of the MBMS service. For example, the postponing may be performed by postpone component 914 of apparatus 902. Thus, when the UE is receiving an MBMS service in the idle mode, the UE may determine to postpone the periodic network reselection search until the MBMS service concludes. The UE may make a single determination to postpone the periodic network reselection search. When the MBMS service concludes and/or the UE finishes receiving the MBMS service, the UE may perform the periodic network reselection search, at 810.

As illustrated at 812, the UE may instead postpone the periodic network reselection search for a period of time while the UE receives the MBMS service. For example, the postponing may be performed by postpone component 914 of apparatus 902. When the period of time expires, the UE may determine, at 814, whether to continue to postpone the periodic network reselection search for the period of time based on whether the UE is continuing to receive the MBMS service. The Thus, the UE may determine, at 814, whether the MBMS service is ongoing. For example, the determination may be performed by MBMS component 910 and/or determination component 912 of apparatus 902. If the UE is continuing to receive the MBMS service, the UE may determine to postpone the periodic network reselection search, again, for the period of time, at 812. For example, the determination may be performed by determination component 912 of apparatus 902. When the period of time expires, the UE repeats the determination at 814. This continues until the UE determines, at 814, that the UE is no longer receiving the MBMS service. Then, the UE performs the network selection search, at 816.

The MBMS service may comprise transmission bursts. The UE may perform the periodic network reselection search, at 818, in an interleaved manner with reception of the transmission bursts of the MBMS service. For example, the interleaving may be performed by interleave component 918 of apparatus 902. As described in connection with FIG. 6, the MBMS service may be scheduled so that there are gaps between MBMS data transmission. The UE may use at least one gap to perform the periodic network reselection search. As described in connection with FIG. 7, the periodic network reselection search may be performed in multiple blocks, e.g., 704, 708, interleaved in time between reception of the MBMS service, e.g., 702, 706, 708. The UE may perform a partial periodic network reselection search between the transmission bursts of the MBMS service and may return to receiving the MBMS service following the partial periodic network reselection search.

The MBMS service may be received on a first frequency, and the UE may perform the periodic network reselection search, whether partial or full, using at least one other frequency. Thus, the UE may leave the MBMS frequency to perform at least a portion of the periodic network reselection search on other frequencies.

The UE may perform the periodic network reselection search between two MBMS bursts. The search may be performed by search component 916 of apparatus 902. Thus, the UE may perform the full periodic network reselection search between a first MBMS burst and the following MBMS burst. As illustrated at 819, as part of performing the periodic network reselection search in an interleaved manner, at 819, the UE may postpone the periodic network reselection search until a period of inactivity between the two MBMS bursts having a length corresponding to the full periodic network reselection search.

At 820, the UE may provide an indication to a user regarding the periodic network reselection search. For example, the indication may be provided by indication component 920 and/or transmission component 906 of apparatus 902. This may include a message to the UE requesting user input as to whether the user wants to initiate the search for a higher priority PLMN. The message may indicate that the search for a higher priority PLMN will suspend streaming/downloading of the MBMS service. The message may ask whether the user wants to proceed with the periodic network reselection search or to cancel the search.

At 822, the UE may receive a first user input to proceed with the periodic network reselection search or a second user input to continue receiving the MBMS service. For example, the input may be received by user input component 922 of apparatus 902. When the UE receives the first user input, at 822, to proceed with the periodic network reselection search, the UE may determine at 823, to suspend reception of the MBMS service to perform the periodic network reselection search, at 825. When the UE receives, at 822, the second user input to continue receiving the MBMS service, the UE may determine, at 823, to delay the periodic network reselection search. Thus, at 824, the UE may delay the search.

The UE may delay the periodic network reselection search for a duration of the MBMS service, e.g., as described in connection with 808. In another example, the UE may delay the periodic network reselection search for a period of time when the UE is receiving the MBMS service, as described at 812. When the period of time expires, the UE may determine, as described for 814, whether to continue to delay the periodic network reselection search for another period of time based on whether the UE is continuing to receive the MBMS service.

If a higher priority PLMN is found during the periodic network reselection search at 810, 816, 818, 825, the UE may delay changing to the higher priority PLMN based on the reception of the MBMS service. Changing to the higher priority PLMN could disrupt reception of the MBMS service. Thus, similar to the delaying the periodic network reselection search at 806 or 812, the UE may delay switching to the higher priority PLMN until the UE has finished receiving the MBMS service. Once the MBMS service concludes, the UE may register with the higher priority PLMN.

Figure 9:
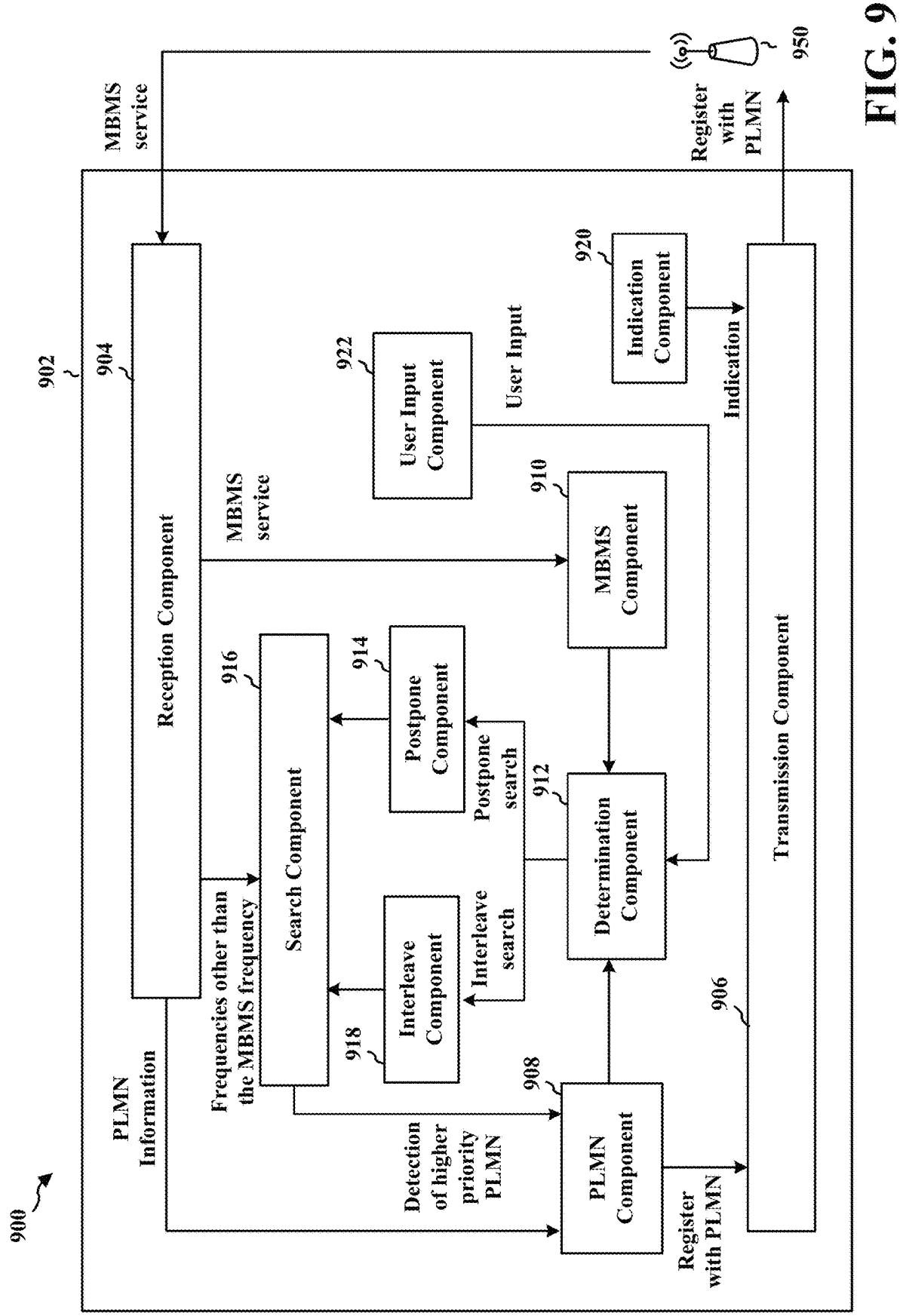
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE (e.g., UE 104, 350, 420, 425) or a component of a UE. The apparatus includes a reception component 904 that receives downlink communication from a base station 950 and a transmission component that transmits uplink communication to a base station 950.

The apparatus may include a PLMN component 908 configured to register on a first PLMN, e.g., as described in connection with 802 in FIG. 8. The apparatus may include an MBMS component 910 configured to receive an MBMS service, e.g., MBMS streaming service or MBMS download service, e.g., as described in connection with 804 in FIG. 8. At times, the MBMS service may be received while the apparatus is in an idle mode. The apparatus may include a determination component 912 configured to determine whether to perform a periodic network reselection search for a higher priority PLMN while in the idle mode, e.g., as described in connection with 806 and/or 814 in FIG. 8. The determination component 912 may determine whether to perform the periodic network reselection search based on reception of the MBMS service.

The apparatus may include a postpone component 914 configured to postpone the periodic network reselection search based on the reception of the MBMS service, e.g., as described in connection with any of 812, 808, 819, or 824 in FIG. 8. The postpone component may be configured to postpone the periodic network reselection search for a duration of the MBMS service. In another example, the postpone component may be configured to repeatedly postpone the periodic network reselection search for a period of time while the UE receives the MBMS service, and when the period of time expires, the determination component 912 may again determine whether to continue to postpone the periodic network reselection search for the period of time based on whether the UE is continuing to receive the MBMS service.

The apparatus may include an interleave component 918 configured to perform the periodic network reselection search in an interleaved manner with reception of the transmission bursts of the MBMS service, e.g., as described in connection with 818 in FIG. 8. The interleave component 918 may interleave partial blocks of the periodic network reselection search between MBMS busts or may postpone the periodic network reselection search until a period of inactivity between the two MBMS bursts having a length corresponding to the full periodic network reselection search.

The apparatus may include a search component 916 configured to perform the periodic network reselection search, e.g., as described in connection with any of 810, 816, 818, or 825 in FIG. 8. The search may be performed, e.g., at the end of the delay created by the postpone component 914 or based on the interleaved manner indicated by the interleave component 918. When the search component 916 detects a higher priority PLMN, the search component may provide PLMN information to the PLMN component 908. The PLMN component may reselect to the higher priority PLMN.

The apparatus may include an indication component 920 configured to provide an indication to a user, e.g., display a message, regarding the periodic network reselection search, e.g., as described in connection with 820 in FIG. 8. The apparatus may include a user input component 922 configured to receive a first user input to proceed with the periodic network reselection search or a second user input to continue receiving the MBMS service, e.g., as described in connection with 822 in FIG. 8. The user input component 922 may provide the user input, e.g., whether to perform the search, cancel the search, or delay the search, to the determination component 912. The user input may be used to determine whether to perform the periodic network reselection search, as described in connection with any of 823, 824, or 825.

The apparatus may include additional components that perform each of the blocks of the algorithm in the aforementioned flowchart of FIG. 8 and the aspects described in FIGS. 4A-7. As such, each block in the aforementioned flowchart of FIG. 8 and the aspects described in FIGS. 4A-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
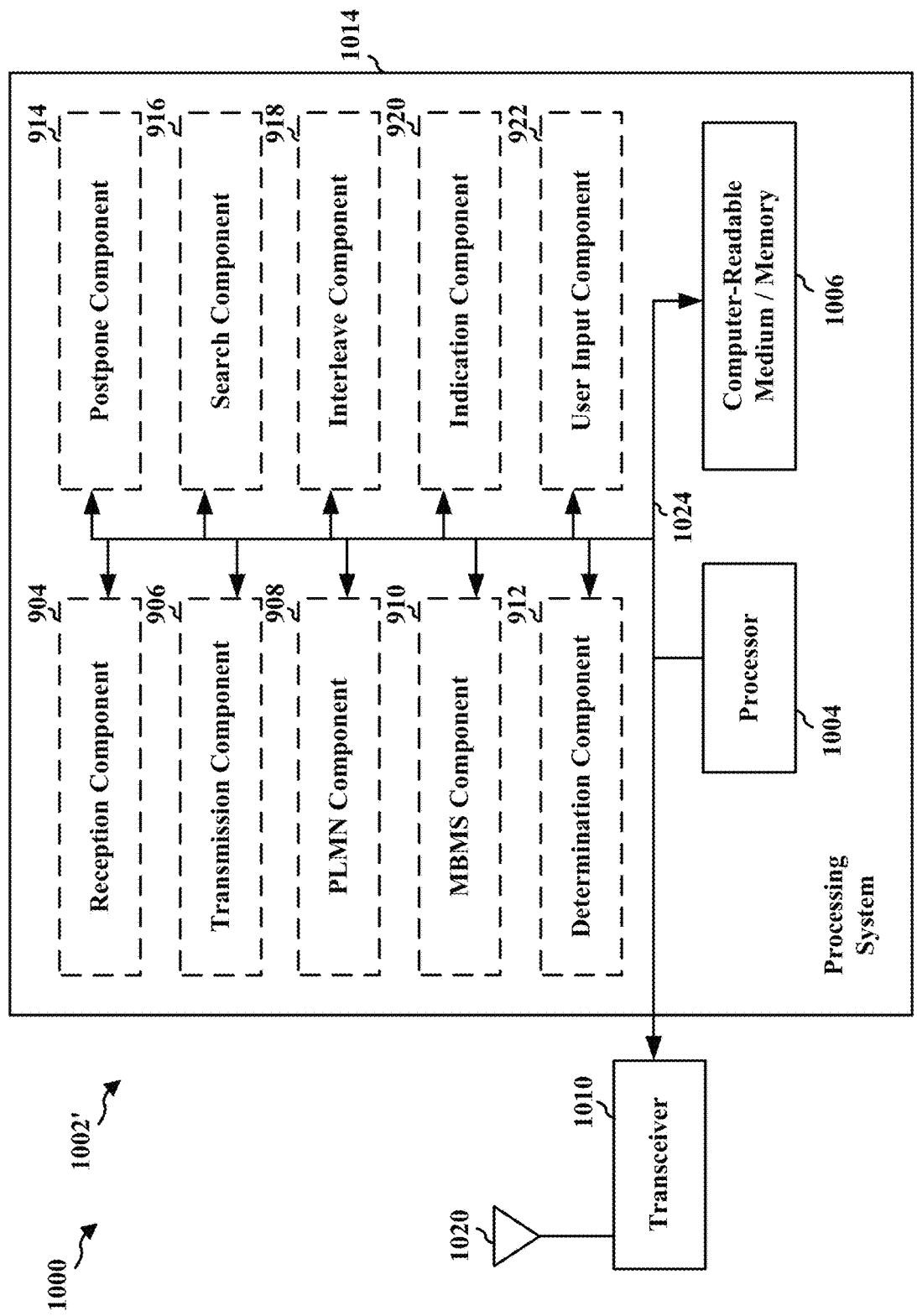
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920, 922, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920, 922. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternately, the apparatus may comprise the entire UE, e.g., UE 350.

In one configuration, the apparatus 902/902' for wireless communication includes means for registering on a first PLMN and means for receiving an MBMS service while in an idle mode. The apparatus includes means for determining whether to perform a periodic network reselection search for a higher priority PLMN while in the idle mode based on reception of the MBMS service. The apparatus may include means for postponing the periodic network reselection search for a duration of the MBMS service. The apparatus may include means for postponing the periodic network reselection search for a period of time while the UE receives the MBMS service. The apparatus may include means for determining, when the period of time expires, whether to continue to postpone the periodic network reselection search for the period of time based on whether the UE is continuing to receive the MBMS service. The apparatus may include means for performing the periodic network reselection search in an interleaved manner with reception of the transmission bursts of the MBMS service. The apparatus may include means for postponing the periodic network reselection search until a period of inactivity between the two MBMS bursts having a length corresponding to the full periodic network reselection search. The apparatus may include means for providing an indication to a user regarding the periodic network reselection search. The apparatus may include means for receiving a first user input to proceed with the periodic network reselection search or a second user input to continue receiving the MBMS service. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   registering on a first Public Land Mobile Network (PLMN);
   receiving a Multimedia Broadcast Multicast Services (MBMS) service while in an idle mode, wherein the MBMS service comprises transmission bursts; and
   determining whether to perform a periodic network reselection search for a higher priority PLMN while in the idle mode, wherein the UE determines whether to perform the periodic network reselection search based on reception of the MBMS service;
   performing the periodic network reselection search in an interleaved manner with reception of the transmission bursts of the MBMS service.

2. The method of claim 1, wherein the periodic network reselection search comprises a High Priority-PLMN (HP-PLMN) search.

3. The method of claim 2, wherein performing the periodic network reselection search further comprises performing a partial HP-PLMN search in blocks that are interleaved with ongoing MBMS transmission bursts.

4. The method of claim 1, wherein the MBMS service comprises an MBMS streaming service or an MBMS download service.

5. The method of claim 1, wherein the MBMS service is received while roaming in a Visited PLMN (VPLMN).

6. The method of claim 5, further comprising:
   postponing the periodic network reselection search for a period of time while the UE receives the MBMS service in the idle mode.

7. The method of claim 6, wherein the UE postpones the periodic network reselection search for a duration of the MBMS service.

8. The method of claim 6, further comprising:
   determining whether to continue to postpone the periodic network reselection search for an additional period of time based on whether the UE is continuing to receive the MBMS service when the period of time expires.

9. The method of claim 1, wherein the periodic network reselection search is performed in multiple blocks interleaved in time between the reception of the transmission bursts of the MBMS service.

10. The method of claim 1, wherein the UE performs a partial periodic network reselection search between the transmission bursts of the MBMS service and returns to receiving the MBMS service following the partial periodic network reselection search.

11. The method of claim 1, wherein the MBMS service is received on a first frequency and the UE performs the periodic network reselection search using at least one other frequency.

12. The method of claim 1, wherein the UE performs the periodic network reselection search between two MBMS bursts.

13. The method of claim 12, further comprising:
   postponing the periodic network reselection search until a period of inactivity between the two MBMS bursts having a length corresponding to a full periodic network reselection search.

14. The method of claim 1, further comprising:
   providing an indication to a user regarding the periodic network reselection search; and
   receiving a first user input to proceed with the periodic network reselection search or a second user input to continue receiving the MBMS service.

15. The method of claim 14, wherein when the UE receives the first user input to proceed with the periodic network reselection search, the UE suspends the reception of the MBMS service to perform the periodic network reselection search.

16. The method of claim 14, wherein when the UE receives the second user input to continue receiving the MBMS service, the UE delays the periodic network reselection search.

17. The method of claim 16, wherein the UE delays the periodic network reselection search for a duration of the MBMS service.

18. The method of claim 16, wherein the UE delays the periodic network reselection search for a period of time when the UE is receiving the MBMS service and when the period of time expires, the UE determines whether to continue to delay the periodic network reselection search for another period of time based on whether the UE is continuing to receive the MBMS service.

19. An apparatus for wireless communication at a user equipment (UE), comprising:
means for registering on a first Public Land Mobile Network (PLMN);
means for receiving a Multimedia Broadcast Multicast Services (MBMS) service while in an idle mode, wherein the MBMS service comprises transmission bursts;
means for determining whether to perform a periodic network reselection search for a higher priority PLMN while in the idle mode, wherein the UE determines whether to perform the periodic network reselection search based on reception of the MBMS service; and
means for performing the periodic network reselection search in an interleaved manner with reception of the transmission bursts of the MBMS service.

20. The apparatus of claim 19, further comprising:
means for postponing the periodic network reselection search for a period of time while the UE receives the MBMS service in the idle mode.

21. The apparatus of claim 20, further comprising:
means for determining whether to continue to postpone the periodic network reselection search for an additional period of time based on whether the UE is continuing to receive the MBMS service when the period of time expires.

22. The apparatus of claim 19, further comprising:
means for providing an indication to a user regarding the periodic network reselection search; and
means for receiving a first user input to proceed with the periodic network reselection search or a second user input to continue receiving the MBMS service,
wherein when the UE receives the first user input to proceed with the periodic network reselection search, the UE suspends the reception of the MBMS service to perform the periodic network reselection search, and
wherein when the UE receives the second user input to continue receiving the MBMS service, the UE delays the periodic network reselection search.

23. An apparatus for wireless communication at a user equipment (UE), comprising:
a memory; and
at least one processor coupled to the memory and configured to:
register on a first Public Land Mobile Network (PLMN);
receive a Multimedia Broadcast Multicast Services (MBMS) service while in an idle mode, wherein the MBMS service comprises transmission bursts;
determine whether to perform a periodic network reselection search for a higher priority PLMN while in the idle mode, wherein the UE determines whether to perform the periodic network reselection search based on reception of the MBMS service; and
perform the periodic network reselection search in an interleaved manner with reception of the transmission bursts of the MBMS service.

24. The apparatus of claim 23, wherein the at least one processor is further configured to:
postpone the periodic network reselection search for a period of time while the UE receives the MBMS service in the idle mode.

25. The apparatus of claim 23, wherein the at least one processor is further configured to:
determine, when the period of time expires, whether to continue to postpone the periodic network reselection search for an additional period of time based on whether the UE is continuing to receive the MBMS service.

26. The apparatus of claim 23, wherein the apparatus performs the periodic network reselection search between two MBMS bursts, wherein the at least one processor is further configured to:
postpone the periodic network reselection search until a period of inactivity between the two MBMS bursts having a length corresponding to a full periodic network reselection search.

27. The apparatus of claim 23, wherein the at least one processor is further configured to:
provide an indication to a user regarding the periodic network reselection search; and
receive a first user input to proceed with the periodic network reselection search or a second user input to continue receiving the MBMS service,
wherein when the UE receives the first user input to proceed with the periodic network reselection search, the UE suspends the reception of the MBMS service to perform the periodic network reselection search, and
wherein when the UE receives the second user input to continue receiving the MBMS service, the UE delays the periodic network reselection search.

28. The apparatus of claim 23, wherein the least one processor configured to perform the periodic network reselection search is further configured to perform a partial High Priority-PLMN (HP-PLMN) search in blocks that are interleaved with ongoing MBMS transmission bursts.

29. A non-transitory computer-readable medium storing computer executable code for wireless communication at a user equipment (UE), comprising code to:
register on a first Public Land Mobile Network (PLMN);
receive a Multimedia Broadcast Multicast Services (MBMS) service while in an idle mode, wherein the MBMS service comprises transmission bursts; and
determine whether to perform a periodic network reselection search for a higher priority PLMN while in the idle mode, wherein the UE determines whether to perform the periodic network reselection search based on reception of the MBMS service; and
perform the periodic network reselection search in an interleaved manner with reception of the transmission bursts of the MBMS service.

* * * * *